United States Patent

Fattor

Patent Number: 5,456,744
Date of Patent: Oct. 10, 1995

[54] TRACTION WITH DIATOMACEOUS EARTH

[76] Inventor: Arthur P. Fattor, 5380 S. Holly St., Englewood, Colo. 80111-1413

[21] Appl. No.: 21,224

[22] Filed: Feb. 23, 1993

[51] Int. Cl.$^6$ .................................................. C09K 3/14
[52] U.S. Cl. ................................................ 106/36
[58] Field of Search ............................... 106/36

[56] References Cited

U.S. PATENT DOCUMENTS 2,819,681  1/1958  Luvisi ........................ 106/36
3,878,147  4/1975  Craven ....................... 260/18 R Primary Examiner—David Brunsman

[57] ABSTRACT

Diatomaceous earth in the powder form, to be used 1 when applied as a surface application to provide traction for pedestrians traversing icy walkways; 2 as a means of providing escape traction for vehicles which are hopelessly stuck on an icy highway; and 3 to provide sustaining traction when a vehicle is in motion on icy-covered highways for a long distance, as a result of the property of diatomaceous earth powder to cling to the drive-wheel tires.

13 Claims, 1 Drawing Sheet

TRACTION EFFECTIVENESS ON ICE

| NORTHWOOD SNOW & ICE REMOVER | PREMERE ICE MELTER | SALT | SAND | PIATOMACEOUS EARTH POWDER | SLOPE ANGLE |
|---|---|---|---|---|---|
| INEFFECTIVE | INEFFECTIVE | INEFFECTIVE | SLIGHT | SUSTAINED POSITIVE TRACTION AT ALL ANGLES | 0° |
| INEFFECTIVE | INEFFECTIVE | INEFFECTIVE | INEFFECTIVE | | 3° |
| INEFFECTIVE | INEFFECTIVE | INEFFECTIVE | INEFFECTIVE | | 6° |
| INEFFECTIVE | INEFFECTIVE | INEFFECTIVE | INEFFECTIVE | | 15° |

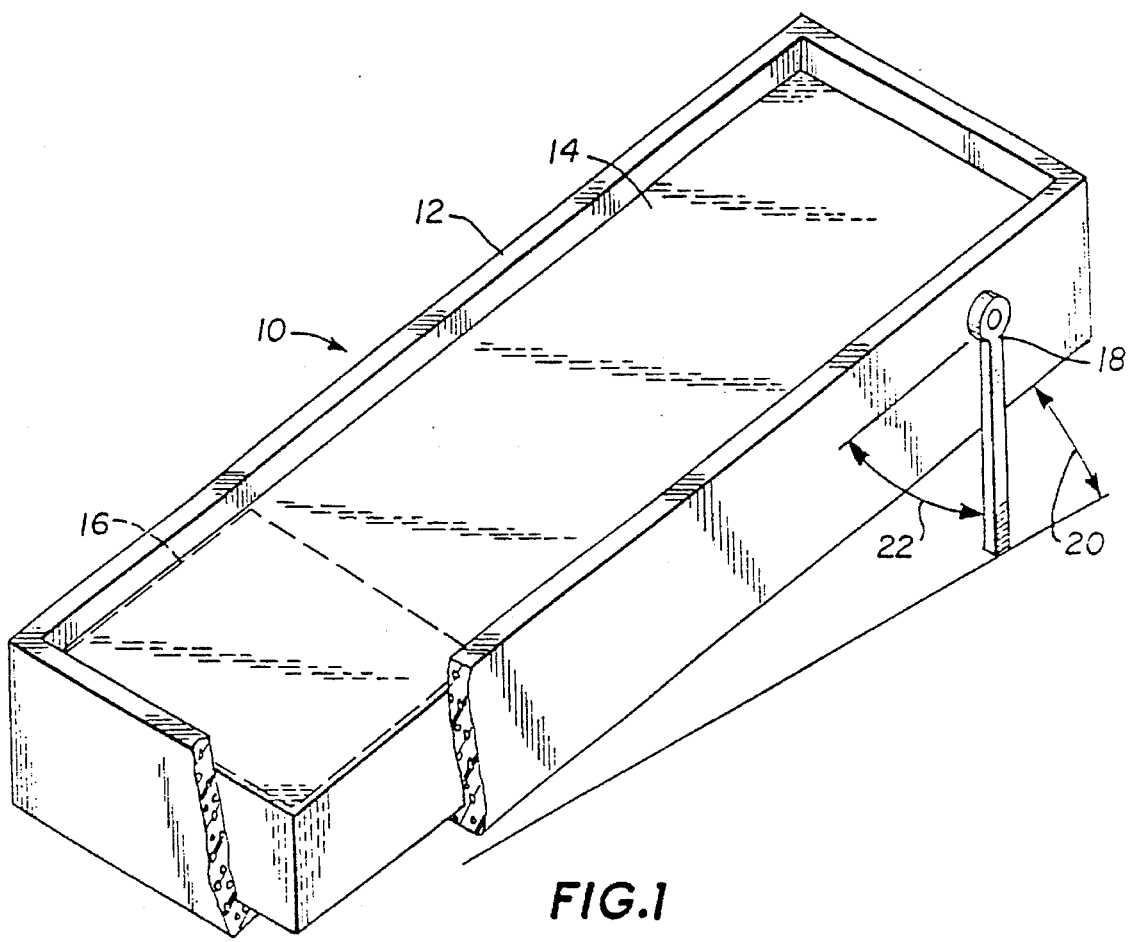

FIG.1

TRACTION EFFECTIVENESS ON ICE

| NORTHWOOD SNOW & ICE REMOVER | PREMERE ICE MELTER | SALT | SAND | PIATOMACEOUS EARTH POWDER | SLOPE ANGLE |
|---|---|---|---|---|---|
| INEFFECTIVE | INEFFECTIVE | INEFFECTIVE | SLIGHT | SUSTAINED POSITIVE TRACTION AT ALL ANGLES | 0° |
| INEFFECTIVE | INEFFECTIVE | INEFFECTIVE | INEFFECTIVE | | 3° |
| INEFFECTIVE | INEFFECTIVE | INEFFECTIVE | INEFFECTIVE | | 6° |
| INEFFECTIVE | INEFFECTIVE | INEFFECTIVE | INEFFECTIVE | | 15° |

FIG.2

TRACTION WITH DIATOMACEOUS EARTH

This invention pertains to a new use of diatomaceous earth, and in no way is related to its present use, some of which applications are listed below.

PRIOR ART

A review of United States Patents, as well as literature such as the Encyclopedia Britannica discloses no use of diatomaceous earth in application as a traction material, to serve man in the cold winter months—at which time the presence of ice on highways and walkways presents so much danger to the pedestrians and motorists.

Some of the many uses of diatomaceous earth, as it has served man for many years, are as follows:

(a) as an absorbent for nitroglycerin in dynamite, (b) as a filter aid for oils, alcoholic beverages, antibiotics, solvents, and extensively used in purifying the water in swimming pools, (c) as a filler in paper, paint, brick, ceramics, linoleum, plastics, and soap, (d) as insulation for high-temperature furnaces, (e) as a means of making an insulating-plaster, (f) as a mild abrasive in metal polishes and toothpaste.

THE PRESENT INVENTION

This invention concerns the new use of diatomaceous earth in either the granular or powder forms as an effective traction agent where hardened snow or ice are encountered. The main uses are as follows:

(a) as a traction agent for the safety of pedestrians traversing on ice-covered walkways. Both the powder and granular forms are equally effective, (b) the effective use of diatomaceous earth in the powder form, to provide escape for a vehicle which is hopelessly stuck on ice, (c) providing sustaining traction for a vehicle in motion, as a result of the property of diatomaceous earth as a powder to cling to the drive-wheels of a vehicle and thus permit controlled driving for great distances, even on black ice.

OBJECTS AND PROOF OF THIS INVENTION

Proof of the effectiveness of diatomaceous earth as a helpful traction agent for use by pedestrians and motorists, was set up using both laboratory and field tests. The laboratory tests were made using only diatomaceous earth as a powder; whereas, the field tests included both the granules and the powder.

LABORATORY TEST

BRIEF DESCRIPTION OF THE DRAWINGS

FIG. 1 discloses a small slab of ice in a mold, which (for this test) was 24 inches long, 8 inches wide, and 2 inches thick. This size of slab had no significance only that it was convenient. Various angles of slope for the surface of ice slab 14 were provided by a slight rotation of member 18 through an angle 22 forming angle 20, which ranged between 0 and 15 degrees.

Selected for test were materials such as two salts sold in the Denver area, under the names: "Premiere Ice Melter," and "Northwoods Ice & Snow Melter." In addition, common household salt was tested, as well as sand, one-sixteenth of an inch in diameter. Other materials tested were fly-ash and cat-litter.

Finally, diatomaceous earth powder—about the consistency of flour used in baking—was used.

The area shown on FIG. 1, as 16, which is outlined at the lower part of ice slab 14, was where test materials were placed.

In order to simulate a motor vehicle, several battery-operated toy vehicles were used, with rubber drive-wheels 1½ to 2 inches in diameter.

Each material was tested at the four slope angles of the ice slab indicated in FIG. 2; namely, angles of 0, 3, 6, and 15 degrees.

Traction of materials used in these tests and shown in FIG. 2, disclosed that the ice-melting salts (three of which are listed) provided no traction to permit the test units to move up the inclined slab of ice. Sand provided a small amount of traction initially at 0-degrees slope, but failed to provide any traction at the 3 to 15 degree slopes. However, when diatomaceous earth powder was used, the test units were able to easily move the entire 24-inch length of the smooth-ice surface, without slipping—even at the 15-degree slope.

The fly-ash and cat-litter that were tested provided no traction.

In analyzing the ease with which the test cars moved completely up the ice slab, it was observed that the diatomaceous earth powder had adhered to the rubber tires. This property of diatomaceous earth powder, to cling to the rubber tires, was what provided continuous traction necessary for the test cars to progress up the 24-inch length of the slab of ice.

FIELD TEST

Motor Vehicles

Laboratory testing did much to guide the field-testing program, for the evaluation of diatomaceous earth powder in such things as investigating conditions where motor vehicles were stuck on ice, or slippery snow; also, to investigate the property of diatomaceous earth to cling to the drive-wheels of a vehicle in motion.

In this program, the following situations were set up for evaluation:

1. to what extent would diatomaceous earth be of benefit in freeing a large tractor-trailer stuck on a mountain highway.

2. what benefit diatomaceous earth powder would provide for motor vehicles which have lost traction on an ice-covered highway and as a consequence became stalled.

3. to investigate the effect in obtaining traction by drive-tires, holding diatomaceous earth powder over an extended length of icy highway; and how traction could be maintained throughout a test run.

In this program, a test of a large semi-tractor was made on a mountain highway which had a slippery, hard-snow surface, and which had a slope of 4 degrees. The large semi was purposely stalled despite spinning its large dual wheels, and it could not escape. Diatomaceous earth powder was then spread 10 feet in back and 10 feet in front of the dual-drive-tires which had a coating of hardened snow. The driver was then told to back up about 8 feet and proceed forward. To the amazement of the driver and all, the heavy semi moved easily forward and continued without slipping. On examination of the drive-tires of the semi, one-half mile from the place it was stalled, it was observed that diatomaceous earth powder was still clinging to the tires and, therefore, had provided traction to sustain nonslip motion for the big semi.

In another test, a passenger vehicle was purposely stalled on an area that had black ice and was hopelessly stuck. Diatomaceous earth powder was spread to the front and to the rear of its drive-tires. The vehicle was then made to back over the diatomaceous earth powder. Upon doing so, it was observed that the drive-tires were coated with diatomaceous earth powder. When the vehicle was placed in driving gear, it moved forward without hesitation, and it proceeded up the ice-covered highway without difficulty.

In this test, sand provided no traction on the ice; but, in another test, improved traction was to be seen where sand was used on hardened snow.

The findings of the field tests proved the effectiveness of diatomaceous earth powder as a traction agent on both snow and ice, not only to provide escape for a vehicle stuck on an icy spot but to maintain sustaining traction for a vehicle in motion.

PEDESTRIAN WALKWAYS

In these tests, diatomaceous earth, in the powder and granular forms, was evaluated as a traction material in promoting safety for pedestrians traversing icy sidewalks or walkways. The granular form of diatomaceous earth—about an eighth of an inch in diameter—provided immediate traction for one traversing an icy walkway. The powder form was equally effective; but, because the granular form could be spread more conveniently, it is thought to be preferred. Being an inert solid, diatomaceous earth does not depend upon melting the ice and thus provides safety as a traction agent for pedestrians the instant it is spread over ice or slick snow.

The significant deference between diatomaceous earth and ice-melting salts now on the market is that diatomaceous earth, of itself, provides mediate traction for the safety of pedestrians. Whereas, ice-melting salts of themselves provide no traction protection until the ice on which they are spread is melted. It is to be further noted that ice-melting salts are corrosive and thus attack concrete, as well as metal surfaces. Diatomaceous earth, on the other hand, is not corrosive, being chemically inert and is biodegradable. Further, diatomaceous earth is not harmful to the environment and has been said to be helpful in promoting healthy lawns.

What is claimed is:

1. A method of increasing traction of a surface by coating said surface with diatomaceous earth as a POWDER, thus employing a capillary suction.

2. The method of claim 1, wherein said surface is an automotive tire.

3. The method of claim 1, where said surface is a railroad track.

4. The method of claim 1, wherein said surface is the sole of a shoe.

5. The method of claim 1, where said surface is selected from the group consisting of snow and ice.

6. The method of claim 1, where said surface is selected from the group consisting of asphalt and concrete.

7. The method of claim 1, wherein said coating step comprises the step of coating the drive-tires of a vehicle-in-motion with diatomaceous earth as a powder, by an electrically-operated, mechanical feeder capable of dispensing said diatomaceous earth unto said tires from a position adjacent to said tires, and whereas said electrically-operated, mechanical-operated feeder is energized from an electric, in-line switch, accessible to the driver of said vehicle.

8. The method of claim 1, wherein said coating step comprises passing the tires of a moving vehicle over a layer of diatomaceous earth as a powder which overlays a roadbed.

9. The method of claim 1, wherein said coating step comprises the step of coating the drive-tires of a vehicle-in-motion with diatomaceous earth as a powder, by means of airspray of diatomaceous earth, issuing from an electrically-operated device, located adjacent to and in front of said tires and wherein said electrically-operated spraying device is energized by an electrical switch, accessible to the driver of said vehicle.

10. The method of claim 1, wherein said surface comprises tires of a moving vehicle and said increase in traction for said tires is maintained as long as said tires are in contact with a roadbed that is coated with snow or ice.

11. The method of claim 1, wherein said surface comprises drive-tires of a vehicle-in-motion and said coating step comprises dispersing said diatomaceous earth as a powder, by an electrically-operated, attached device, located in front of said tires and whereas electrically-operated, dispensing device is electrically energized by an in-line electrical switch, accessible to the driver of said vehicle.

12. The method of claim 1, wherein said surface is coated with diatomaceous earth as a powder, using an adhesive that does not interfere with the capillary suction of said diatomaceous earth.

13. A method for providing traction on a frozen or snow-covered road, walkway, or runway, by applying a coating of diatomaceous earth as a powder to said road, walkway, or runway.

* * * * *